US011666171B2

(12) United States Patent
Brun-Cosme-Gazot

(10) Patent No.: US 11,666,171 B2
(45) Date of Patent: Jun. 6, 2023

(54) PRESSURE SAFETY CLOSING SYSTEM FOR PRESSURE COOKING APPLIANCE

(71) Applicant: ILLINOIS TOOL WORKS INC., Glenview, IL (US)

(72) Inventor: Jean-Marc Brun-Cosme-Gazot, Passenans (FR)

(73) Assignee: ILLINOIS TOOL WORKS INC., Glenview, IL (US)

(*) Notice: Subject to any disclaimer, the term of this patent is extended or adjusted under 35 U.S.C. 154(b) by 378 days.

(21) Appl. No.: 16/925,407

(22) Filed: Jul. 10, 2020

(65) Prior Publication Data
US 2021/0015289 A1  Jan. 21, 2021

(30) Foreign Application Priority Data
Jul. 19, 2019  (EP) .................................. 19187241

(51) Int. Cl.
*A47J 27/08* (2006.01)
*A47J 36/04* (2006.01)

(52) U.S. Cl.
CPC ........... *A47J 27/0815* (2013.01); *A47J 36/04* (2013.01)

(58) Field of Classification Search
CPC ........ A47J 27/14; A47J 27/0815; A47J 36/10; A47J 27/08; A47J 36/04; A47J 37/128
See application file for complete search history.

(56) References Cited

U.S. PATENT DOCUMENTS 4,840,287 A * 6/1989 Brewer ................. A47J 27/092
126/369
2009/0057318 A1* 3/2009 Aseff ....................... A47J 36/04
220/573.1

FOREIGN PATENT DOCUMENTS

| DE | 202013004851 | 9/2013 | |
| EP | 0721758 | 7/1996 | |
| EP | 721758 A1 * | 7/1996 | .............. A47J 36/10 |
| EP | 1488720 | 12/2004 | |

* cited by examiner

*Primary Examiner* — Dana Ross
*Assistant Examiner* — Kuangyue Chen
(74) *Attorney, Agent, or Firm* — Thompson Hine LLP

(57) ABSTRACT

A cooking appliance includes a pressure vessel, a lid, a locking mechanism having a locking member, and a resiliently compressible seal member. The cooking appliance is adapted to affect the locking mechanism into an inoperable state at an inner vessel pressure greater than or equal to a predetermined pressure when in a locked position.

13 Claims, 4 Drawing Sheets

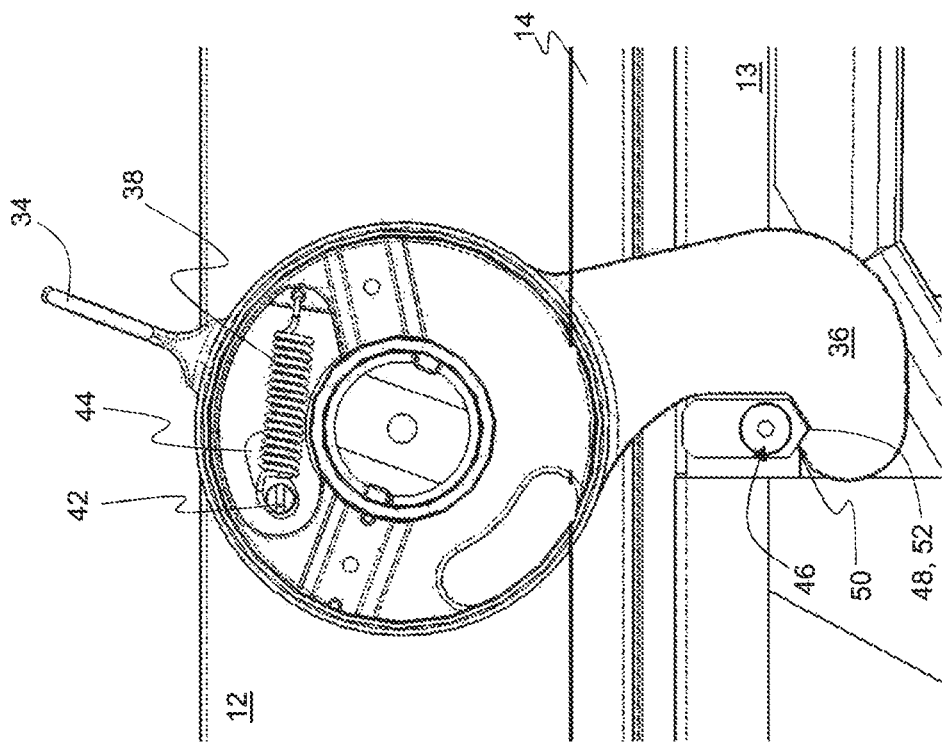
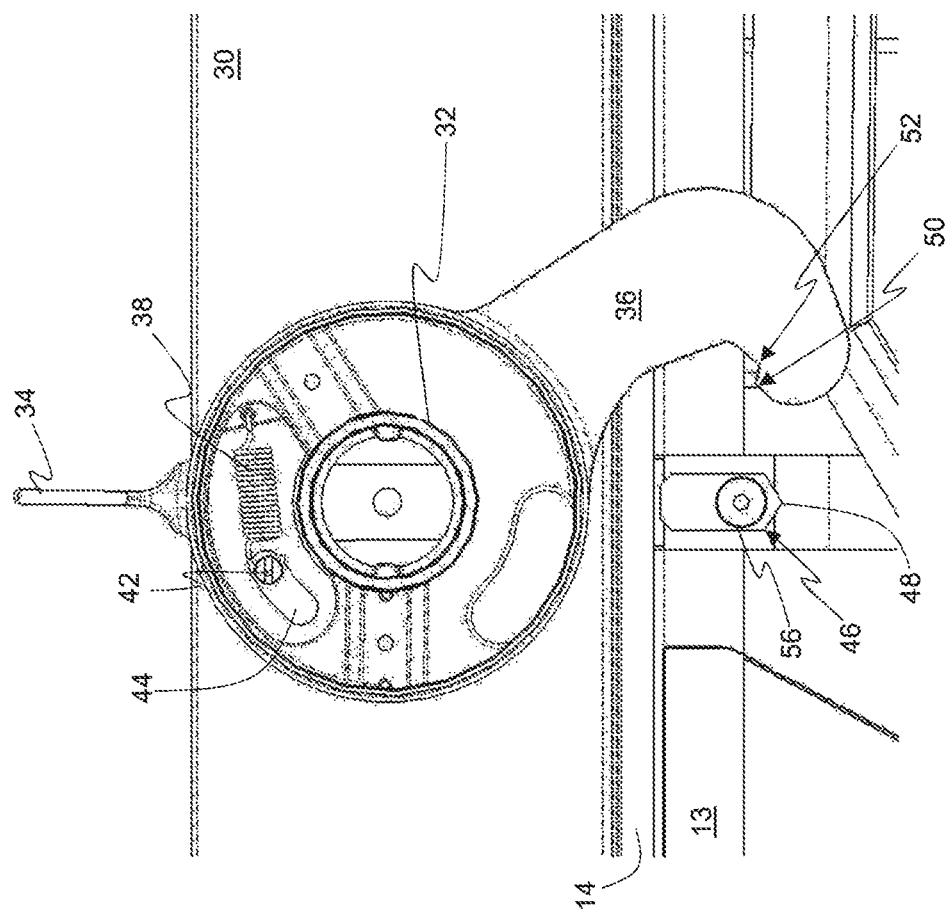

her vent holes that alleviate the pressure from inside the cooker. Such a feature may prevent
PRESSURE SAFETY CLOSING SYSTEM FOR PRESSURE COOKING APPLIANCE The present invention relates to cooking appliance, in particular, but not exclusively, to a cooking appliance for cooking food with the use of pressure in an enclosure using steam, such as a pressure cooker.

INTRODUCTION

Cooking appliances such as pressure cookers have been used extensively both in the domestic setting and in industry. Typically, these cooking appliances have an enclosure for storing and cooking contents, and a cover or lid to seal the contents within the enclosure such that the contents can be heated up. Often, a closing mechanism is provided between the cover and the enclosure to secure the cover or lid and form a watertight seal between the two. For pressure cookers, having a watertight seal is essential, because this precludes any leakage of pressure (at least to a predetermined maximum pressure) of contents from within the enclosure, and further precludes any contents from outside the cooking appliance entering into the enclosure. Preferably, the closing mechanism between the cover and the enclosure is configured to withstand the forces generated from the pressure(s) present inside the enclosure. At the same time, the closing mechanism should prevent the enclosure from being opened, in the event hot steam at a high pressure is still inside. In such a case, i.e. if the closure or lid is opened, high pressure, high temperature steam and/or liquid and other contents may be released from the cooker, potentially scalding or otherwise injuring nearby users.

Some known cooking appliances, such as pressure cookers in particular, may have vent holes that alleviate the pressure from inside the cooker. Such a feature may prevent the build-up of vessel pressure, which would otherwise be released when a user comes to open the cover, or when the closed lid (as well as, the locking mechanism) can no longer withstand the pressure within the cooker. However, one of the drawbacks having vent holes is a significant loss of heat and pressure from inside the cooker, thus, decreasing the efficiency of the cooker.

Other known cooking appliances may utilise relatively complex closure mechanisms and/or safety valves and/or safety locks etc. which can be expensive to manufacture, prone to failure and/or difficult to use. For example, some cooking appliances may use electronic control systems, which again, can be relatively expensive to manufacture, vulnerable to damage and may be difficult to use, replace or repair, in the event of damage. Other known cooking appliances may have closure mechanisms which are engaged and/or integrated with multiple parts of the cooking appliance, making it difficult to interchangeably use such a mechanism across a number of other cooking appliances. Again, specifically designed closure mechanisms may be difficult to replace and/or maintained/repaired etc.

It would therefore be desirable to provide a cooking appliance that can alleviate or mitigate one or more of the aforementioned problems. Particularly, it is an object of the invention to provide an improved cooking appliance configured to preclude the opening of its cover or lid if steam of significant pressure is left in the enclosure. It is another object of the invention to provide a cooking appliance having an adaptable closure mechanism suitable to prevent opening the appliance at potentially harmful pressures that is structurally simple and robust. It is a further object of the invention to provide cooking appliance that has an improved safety feature, as well as, an improved ease of use.

SUMMARY OF THE INVENTION

In accordance with the present invention there is provided a cooking appliance according to the appended claims.

According to an aspect of the present invention, there is provided a cooking appliance, comprising:

a pressure vessel having an opening surrounded by a peripheral edge portion;

a lid pivotally coupled to said vessel and configured to move between an open position and at least a closed position;

a locking mechanism, comprising at least one locking member, operably coupled to one of said lid or said vessel, and at least one catch member, operably coupled to the other one of said lid or vessel, and configured to move between a locked position, where said locking member and said catch member are engaged so as to lockingly secure said lid relative to said vessel, and an unlocked position, where said locking member and said catch member are disengaged so as to release said lid relative to said vessel; and a resiliently compressible seal member interposed between said lid and said peripheral edge portion of said opening, so as to fluidly seal said vessel when said lid is in said closed position, and wherein said cooking appliance is adapted to affect said locking mechanism into an inoperable state at an inner vessel pressure greater than or equal to a predetermined pressure when in said locked position.

This provides the advantage that the cooking appliance automatically locks the closure mechanism, i.e. makes it inoperable, when an inner vessel pressure is equal to or exceeds a predetermined pressure, i.e. the user is prevented from opening the cooking appliance while under potentially harmful pressure. As a result, safety for the user is significantly improved. In addition, the improved cooking appliance and its closure mechanism are of particularly simplistic construct and robust, therefore, minimising manufacturing, repair and/or replacement cost. This advantage also comes from the closure mechanism not needing to be engaged and/or integrated with multiple parts of the cooking appliance, or embedded deep within the cooking appliance, and thus is easy to access.

Advantageously, the lid may be configured to move into an operating position at an inner vessel pressure that is lower than said predetermined pressure, compressing said resiliently compressible seal member and affecting said locking mechanism into an operable state.

Advantageously, the inoperable state may be characterised in that the locking member is irreleasably engaged with the catch member.

Preferably, the operable state may be characterised in that the locking member is releasably engaged with the catch member. Therefore, depending on whether the pressure inside the vessel is greater or less than a predetermined pressure, the locking mechanism is automatically changed between its inoperable state and its operable state. The predetermined pressure could be, for example, a pressure which, when exceeded, could cause injury to the user. In other examples, a factor of safety (i.e. the pressure triggering the operable state could be lower than a potentially harmful pressure) could be applied to the predetermined pressure, so as to further decrease the risk of injury to the user when they operate the cooking appliance.

Advantageously, the locking member may be rotatably coupled to one of said lid or said vessel and may be configured to move between the locked position and the unlocked position when the locking mechanism is in the operable state. Preferably, the locking member may be biased towards the unlocked position.

Advantageously, the locking mechanism may further comprise a handle portion configured to manually move the locking member in the locked position. By providing a handle portion in this way, a user can move a designated part of the locking mechanism to move the locking member, which allows the user to be distanced away from the majority of the moving parts.

Advantageously, the locking member may comprise a hook-shaped end portion configured to lockingly receive the catch member. Preferably, the catch member may be a pin.

Advantageously, the unlocked position may be at a predetermined distance from the locked position. In this way, the allowable movement of the locking member is defined (i.e. restricted) between the unlocked position and the locked position. This is particularly advantageous since the locking member cannot move past these two positions and interfere with other parts of the cooking appliance.

Advantageously, said locking mechanism may comprise a first locking member and a second locking member, operably coupled to opposing sides of one of said lid or said vessel, and a first catch member and a second catch member, operably coupled to respective sides of the other one of said lid or vessel, wherein said first locking member is operably coupled to said second locking member, so as to synchronise the movement between said first locking member and said second locking member. Preferably, said first locking member and said second locking member may be operably coupled by a linking rod pivotably coupled to said lid or vessel.

Advantageously, the seal member may be made from a polymer. Preferably, the polymer may comprise silicone material.

BRIEF DESCRIPTION OF THE DRAWINGS

Embodiments of the invention are now described, by way of example only, hereinafter with reference to the accompanying drawings, in which:

FIGS. 2A-2B illustrates a schematic side view of a locking mechanism of the cooking appliance (2A) in the unlocked position and (2B) in the locked and inoperable position;

DETAILED DESCRIPTION

Figure 1A:
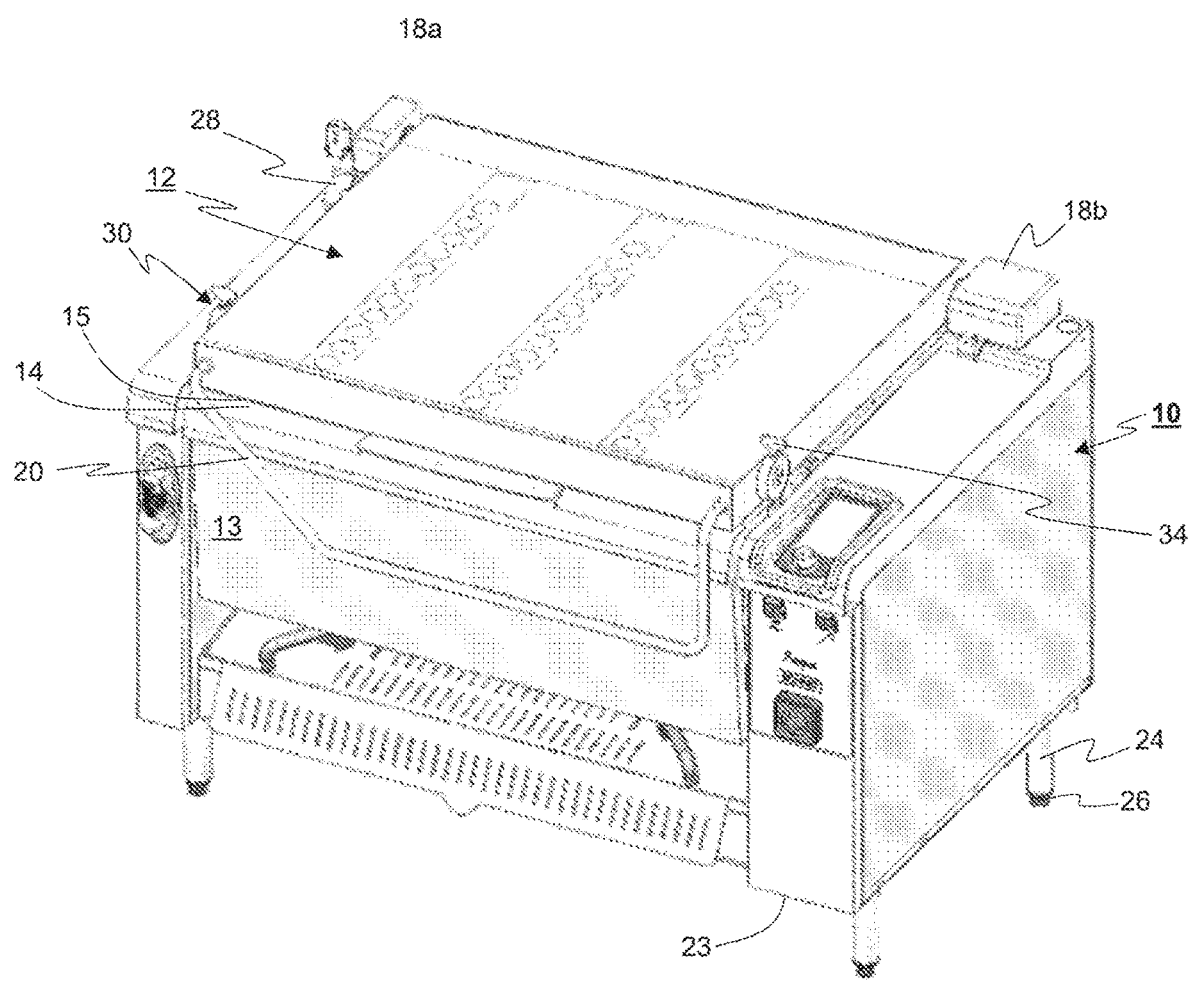
FIGS. 1A-1B illustrates (1A) a perspective view and (1B) a side view of an embodiment of the cooking appliance of the present invention.

The described example embodiment relates to a kitchen cooking appliance and particularly to a pressure cooker. However, the invention is not necessarily restricted to kitchen cooking appliances altogether but may also be used in pressured containers or vessels sealed by a closure or lid and operated by a user.

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, "first", "second", "third" etc. merely indicate that different instances of like objects are being referred to and are not intended to imply that the objects so described must be in a given sequence, either temporally, spatially, in ranking or in any other manner.

Like reference numerals are used to depict like features throughout.

Figure 1B:
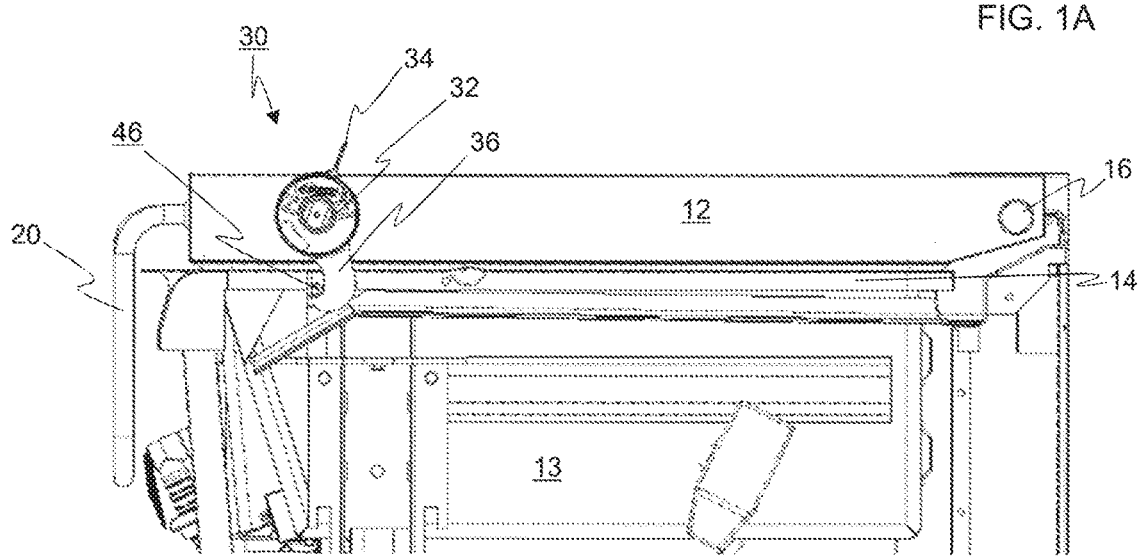

FIG. 1A shows a cooking appliance 10. The cooking appliance 10 has a vessel 13 having an opening (not shown) that is surrounded by an edge portion or rim 15 that is on the periphery of the opening. A lid 12 is rotatably mounted around a shaft 16 and is rotatable about the shaft 16 such that the lid 12 pivots about the vessel 13 and into closing engagement with the opening. That is, the lid 12 is rotatably mounted about the axis of the shaft 16 and configured to move between an open position and a closed position. The closed position is depicted in FIGS. 1A-1B. In the closed position, the lid 12 is substantially horizontal covering (and closing) the opening of the vessel 13, therefore, when in use, allowing foodstuffs (not shown) inside the vessel 13 to be cooked under heat and pressure. In the open position, the lid 12 may be substantially vertical or at least tilted away from the opening so as to provide access to the vessel 13. It should be appreciated that in the open position, the lid 12 could be off-vertical, such as 80° or 100° measured from the plane of the opening, for example, so long as a gap is formed between the lid 12 and the vessel 13 to provide access into the enclosure of the vessel 13. Alternatively, the lid 12 may be movable to a position past 180° from the opening plane.

A seal member 14 is interposed between the lid 12 and the peripheral edge portion 15 of the opening and acts to seal the vessel 13 when the lid 12 is in the closed position. The seal member 14 provides a watertight seal when the lid 12 is closingly engaged with the opening, such that the contents cannot escape the vessel 13 when under pressure. The seal member 14 is resiliently compressible, i.e. it will provide a biasing force when compressed between the lid 12 and the opening. In this example, the seal member 14 is made from silicone, but it should be appreciated that the seal member 14 may be made of any other suitable material. The resiliently compressible seal member 14 that is interposed between the lid 12 and the vessel 13 may provide a varying degree of sealing between the lid 12 and the vessel 13 depending on the compressing force between the lid 12 and the opening.

The cooking appliance is provided with a gripping portion 20 or handle that is mounted to the lid 12. As mentioned before, the lid 12 can be moved between the open and closed position by engaging the gripping portion 20 and pushing or pulling the lid 12 into the required position. The ends of the shaft 16 may be arranged inside protective housing 18A, 18B. In this particular example, the cooking appliance 10 has a support leg 24 extending from the base 23 of the cooking appliance 10 at each corner. A support foot 26 is attached to each support leg 24, to be in contact with the ground. In some examples, the or each support foot 26 is adjustable in height. In some examples, the or each support leg 24 is adjustable in height. The adjustable height of the support leg 24 and/or the support foot 26 allows the levelling of the cooking appliance 10 to be adjusted.

The cooking appliance 10 may also be supplied with a control 22 having a user interface, such as, for example, a touchscreen through which a user can select the mode of operation, particularly cooking modes such as a pressure-cooking mode or frying-mode. The control 22 may also be used to display the operating parameters, and/or settings for cooking. The cooking appliance 10 has a nozzle 28 for supplying water or other fluids to the inside of the vessel 13.

In order to maintain the lid 12 in the closed position, the cooking appliance 10 has a locking mechanism comprising, inter alia, a locking member 30 and catch member 46 (see FIG. 1B and FIGS. 2A-2B). The locking mechanism and its function will be described in more detail with reference to FIGS. 2A-2B.

As shown in FIG. 1A, there is provided a locking mechanism having a locking member 30 which is fixed to the lid 12. As shown in FIG. 1B, the locking mechanism has a hook portion 36 at its distal end that configured to lockingly engage with the catch member 46 provided on an outside surface of the vessel 13 to fixingly secure the lid 12 relative to the vessel 13. In the example illustrated in FIG. 1A, the locking member 30 may be provided on both sides of the lid 12 so as to fix the lid 12 relative to the vessel 13. It should be appreciated that a single locking mechanism may be provided to on any suitable side of the appliance to secure the lid 12 to the vessel 13. It is further envisaged that the locking member 30 may instead be arranged on the vessel 13 and the catch member 46 may instead be arranged on the lid 12. In this particular example, the catch member 46 is a pin, however, the catch member 46 may be any other suitable fastener of any suitable design or shape.

As particularly shown in FIG. 1B, the locking mechanism has a locking member 30 that is operably coupled between the lid 12 and the vessel 13 of the cooking appliance 10. In its locked position, the hook portion 36 of the locking member 30 is mountingly coupled to the catch member 46 so as to fixingly secure the lid 12 relative to the vessel 13. Locking member 30 is pivotally coupled to the lid 12 so as to rotate about its point of attachment to the lid 12. In this particular example, the locking member 30 may be provided with a bearing 32 adapted to facilitate the rotation of the locking member 30 relative to the lid 12. The locking member 30 has a handle portion 34 coupled to locking member 30. In use, the user engages the handle portion 34 so as to rotate the locking member 30. By having a handle portion 34, the locking member 30 can be pivoted between the locked position and the unlocked position.

FIGS. 2A-2B show a detailed view of the locking mechanism of the cooking appliance 10. The locking member 30 is fixed to the lid 12. There is provided a hook portion 36 that is able to engage with the catch member 46 on the outer surface of the vessel 13 to fix the lid 12 relative to the vessel 13. Specifically, the hook portion 36 has a notch 52 that is configured to engage with a v-shaped edge 48 of the catch member 46 to hold the locking member 30 in place. In other words, the notch 52 receives the v-shaped edge 48 so that the catch member 46 is lockingly received by the locking member 30. A lip portion 50 is provided at the end of the hook portion 36 which is designed to hold the locking member 30 in place, and to preclude the locking member 30 from unlatching.

Figure 3A:
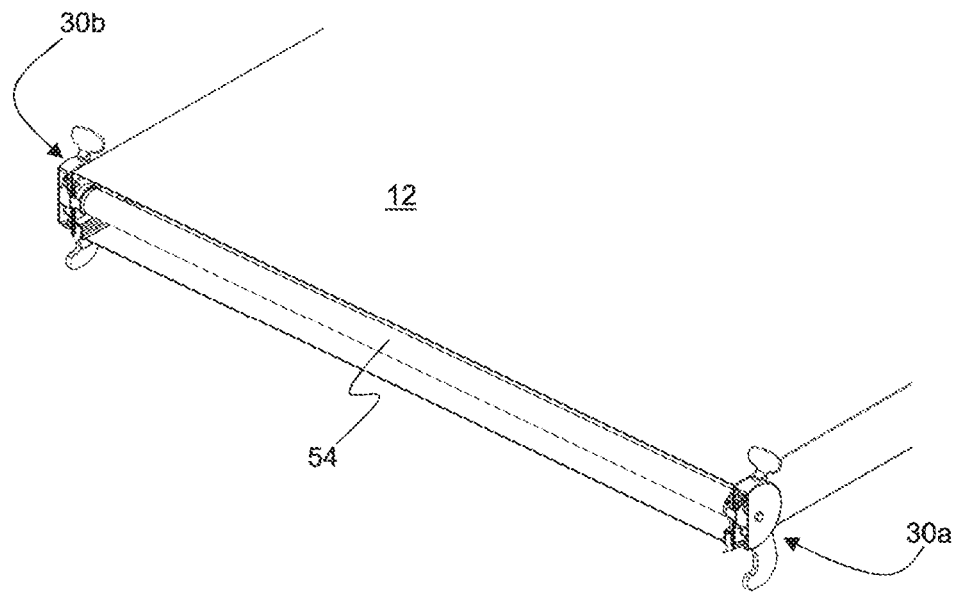
FIGS. 3A-3B illustrates an exploded view of (3A) the lid having two locking members on opposing sides and (3B) the two locking members linked by a rod or shaft so as to provide synchronised movement between the two.
Figure 3B:
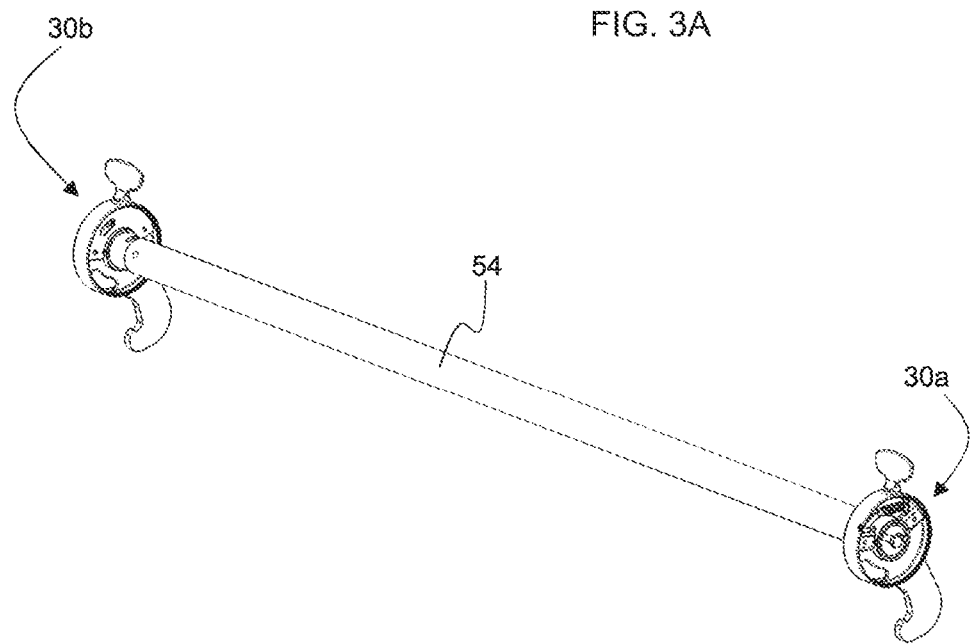

FIGS. 3A-3B shows a locking mechanism having two operably coupled locking members 30a, 30b linked by a pivotable shaft or rod 54 so as to synchronise their movement, i.e. a user may only operate (via handle portion 34) one of the two locking members 30a or 30b to lock both locking members 30a, 30b into engagement with respective catch member 46.

Figure 4B:
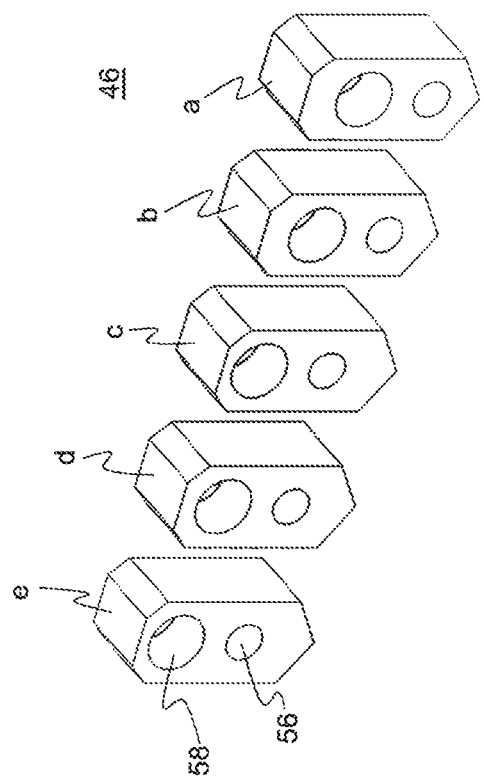
FIGS. 4A-4C illustrates (4A) a cross-sectional view of the appliance and attached catch-member, various embodiments of (4B) a rear-view and (4C) a front view of the catch member.
Figure 4C:
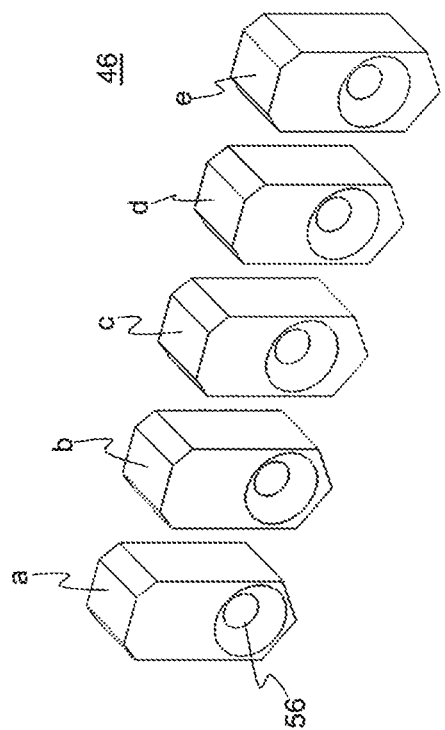
Figure 4A:
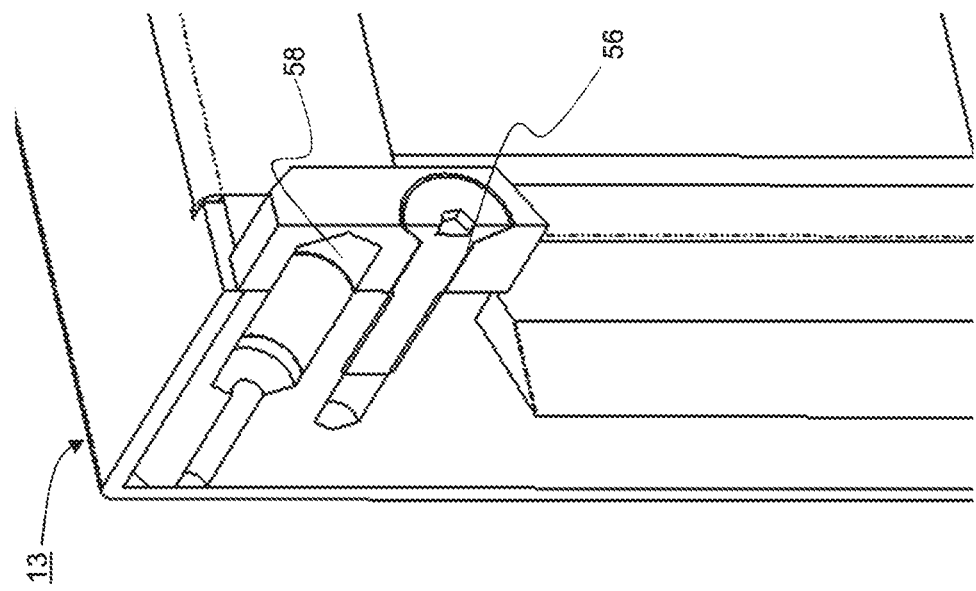

Further, as shown in FIGS. 4A-4C, in order to correctly match the distance between the lid 12 and vessel 13 with the locking mechanism (i.e the correct distance between edge portion 48 of the catch member 46 and the hook portion 36 of the locking member), a suitably dimensioned catch member 46a-e may be used when assembling the appliance, each one of the catch members 46a-e having differently arranged attachment holes 56. I.e. the attachment hole 56 is arranged at different distances from the edge portion 48 so that the distance of the edge portion 48 relative to the vessel's 13 rim (and eventually to the hook portion of the locking member) may be adjusted by using a different one of catch members 46a-e.

Further, a guide pin 42 may be received in a guide aperture 44, the guide aperture 44 being a through-hole in the locking member 30 having a generally elongated arcuate shape. The locking member 30, and thus the guide aperture 44 moves relative to the lid 12 about the point of attachment (i.e. pivot point) of the locking member 30 to the lid 12, whilst the guide pin 42 remains stationary. This limits the rotational movement of the locking member 30 relative to the vessel 13 between the locked position and the unlocked position, i.e. the unlocked position is at a predetermined distance away from the locked position. A biasing element 38, e.g. a spring element, may be provided between the vessel 13 and the locking member 30 so as to bias the locking member towards the unlocked position. The biasing element 38 may be a coil spring, but it should be appreciated that the biasing member 38 could also be any other suitable spring or elastic component, e.g. a helical spring, an elastic band etc.

During use, the user closes the lid 12 and presses the lid 12 against the seal member 15 so as to compress the seal member 15 and reduce the distance between the lid 12 and the opening of the vessel 13 to then move the hook portion 36 of the locking member 30 around and into locking engagement with the catch member 46 (i.e. pin) using the handle portion 34. Once the locking member 30 is engaged with the catch member 46, the user can release the lid 12 so that the locking member 30 and the catch member 46 move into a biased locked position provided by the biasing force of the resiliently compressed seal member 15. The appliance is now ready for operation, i.e. it can be turned on to increase temperature and pressure inside the vessel to cook the food. While the pressure inside the vessel 13 is still below a predetermined threshold pressure (e.g. below 10 mbar above atmospheric pressure outside the vessel 13), the user may still be able to push the lid 12 down so as to compress the seal member 15 and move the hook portion 36 out of engagement with the catch member 46.

However, at an inner vessel pressure that is equal or greater than 10 mbar above atmospheric pressure outside the vessel 13, it is expected that a user would not be able to generate enough force (e.g. for a lid surface of around 1 m²) to move the lid 12 so as to compress the seal member 15 and release the hook portion 36 from the catch member 46. For example, a 1 m² lid surface may require around 1000 N of force to overcome a pressure that is 10 mbar above the atmospheric pressure.

Consequently, at pressures equal to or above a predetermined inner vessel pressure (this pressure may be predetermined depending on the size of the appliance, e.g. vessel volume, lid surface etc.) the closure mechanism is "moved" (actuated) into its inoperable state, i.e. the hook portion 36 is biased (by the inner vessel pressure acting on the inner surface of the lid 12) into a locking engagement with the catch member 46, that cannot be overcome by the user (expected). Therefore, the user is prevented from opening the vessel 13 at inner vessel pressures that could cause damage and/or harm to the user when suddenly released.

As soon as the inner vessel pressure is below a predetermined pressure (e.g. below 10 mbar above atmospheric pressure for a 1 m² inner surface lid), the user will be able to push the lid 12 down and compress the seal member 15 so as to minimise the distance between the lid 12 and the opening of the vessel 13 and "move" (actuate) the locking mechanism into its operable state, to then release the hook portion 36 out of engagement with the catch member 46. The biased locking member then automatically moves back into its open position (due to the spring bias towards the open position) allowing the lid 12 to be opened. The pressure and/or temperature inside the vessel may simply be reduced by turning the heat off and letting the appliance cool down. Alternatively, or additionally, at the end of the cooking process, the heating may be turned off and steam is flushed out through an outlet (not shown). This operation may be controlled by an electronic management system utilising one or more solenoid valves.

For this particular example embodiment (i.e. with an inner surface of the lid 12 in the region of 1 m²), the appliance may have a typical operation pressure (maximum pressure inside the vessel 13 while cooking) of about 150 mbar and a safety pressure of about 250 mbar (i.e. the system cut-off pressure in the event of a fault).

It will be appreciated by persons skilled in the art that the above embodiment(s) have been described by way of example only and not in any limitative sense, and that various alterations and modifications are possible without departing from the scope of the invention as defined by the appended claims. Various modifications to the detailed designs as described above are possible.

The invention claimed is:

1. A cooking appliance, comprising:
a pressure vessel having an opening surrounded by a peripheral edge portion;
a lid pivotally coupled to said vessel and configured to move between an open position and at least a closed position;
a locking mechanism, comprising at least one locking member, operably coupled to one of said lid or said vessel, wherein said locking member comprises a hook-shaped end portion, and at least one catch member, operably coupled to the other one of said lid or aid vessel, and configured to move between a locked position, where said locking member and said catch member are engaged so as to lockingly secure said lid relative to said vessel, and an unlocked position, where said locking member and said catch member are disengaged so as to release said lid relative to said vessel, wherein said hook-shaped end portion is configured to lockingly receive the at least one catch member; and
a resiliently compressible seal member interposed between said lid and said peripheral edge portion of said opening, so as to fluidly seal said vessel when said lid is in said closed position,
wherein an inner vessel pressure of said cooking appliance varies and said cooking appliance is adapted to affect said locking mechanism into an inoperable state when the inner vessel pressure is greater than or equal to a predetermined pressure when in said locked position, the inoperable state being a result of the hook-shaped end portion being biased by the inner vessel pressure acting on an inner surface of the lid into a locking engagement with the catch member that cannot be overcome by a user,
wherein said locking mechanism comprises a first locking member and a second locking member, operably coupled to opposing sides of one of said lid or said vessel, and a first catch member and a second catch member, operably coupled to respective opposing sides of the other one of said lid or said vessel, wherein said first locking member is operably coupled to said second locking member, so as to synchronise the movement between said first locking member and said second locking member, wherein, in order to move said locking member from the locked position to the unlocked position, the lid pivots downward to further compress the resiliently compressible seal member and allow the locking member to release from the catch member.

2. The cooking appliance according to claim 1, wherein said lid is configured to move into an operating position when the inner vessel pressure is lower than said predetermined pressure, compressing said resiliently compressible seal member and affecting said locking mechanism into an operable state.

3. The cooking appliance according to claim 2, wherein, in said inoperable state, said locking member is irreleasably engaged with said catch member.

4. The cooking appliance according to claim 3, wherein said operable state is characterised in that said locking member is releasably engaged with said catch member.

5. The cooking appliance according to claim 4, wherein said locking member is rotatably coupled to one of said lid or said vessel and configured to move between said locked position and said unlocked position when said locking mechanism is in said operable state.

6. The cooking appliance according to claim 5, wherein said locking member is biased towards said unlocked position.

7. The cooking appliance according to claim 1, wherein said locking mechanism further comprises a handle portion configured to manually move said locking member into said locked position.

8. The cooking appliance according to claim 1, wherein said catch member is a pin.

9. The cooking appliance according to claim 1, wherein said unlocked position is at a predetermined distance from said locked position.

10. The cooking appliance according to claim 1, wherein said first locking member and said second locking member are operably coupled by a linking rod pivotally coupled to said lid or said vessel.

11. The cooking appliance according to claim 1, wherein said resiliently compressible seal member is made from a polymer.

12. The cooking appliance according to claim 11, wherein said polymer comprises silicone.

13. A cooking appliance, comprising:
- a pressure vessel having an opening surrounded by a peripheral edge portion;
- a lid pivotally coupled to said vessel and configured to move between an open position and at least a closed position;
- a locking mechanism, comprising at least one locking member, operably coupled to one of said lid or said vessel and at least one catch member, operably coupled to the other one of said lid or said vessel, and configured to move between a locked position, where said locking member and said catch member are engaged so as to lockingly secure said lid relative to said vessel, and an unlocked position, where said locking member and said catch member are disengaged so as to release said lid relative to said vessel; and
- a resiliently compressible seal member interposed between said lid and said peripheral edge portion of said opening, so as to fluidly seal said vessel when said lid is in said closed position, wherein an inner vessel pressure of said cooking appliance varies and said cooking appliance is configured to affect said locking mechanism into an inoperable state when the inner vessel pressure is greater than or equal to a predetermined pressure when in said locked position, wherein, in order to move said locking member from the locked position to the unlocked position, the lid pivots downward to further compress the resiliently compressible seal member and allow the locking member to release from the catch member.

* * * * *